(12) United States Patent
Xia et al.

(10) Patent No.: US 9,965,344 B2
(45) Date of Patent: May 8, 2018

(54) METHOD AND APPARATUS FOR TRANSMITTING DATA IN A ROBOT OPERATING SYSTEM

(71) Applicant: Beijing Baidu Netcom Science and Technology Co., Ltd., Beijing (CN)

(72) Inventors: Liming Xia, Beijing (CN); Jingchao Feng, Beijing (CN); Quan Wang, Beijing (CN); Ning Qu, Beijing (CN); Wei He, Beijing (CN); Chengliang Deng, Beijing (CN); Kaiwen Feng, Beijing (CN); Zhuo Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/409,946

(22) Filed: Jan. 19, 2017

(65) Prior Publication Data
US 2018/0067787 A1 Mar. 8, 2018

(30) Foreign Application Priority Data
Sep. 6, 2016 (CN) .......................... 2016 1 0805758

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G06F 11/30 | (2006.01) |

(52) U.S. Cl.
CPC .......... G06F 9/546 (2013.01); G06F 11/3024 (2013.01); G06F 11/3055 (2013.01); Y10S 901/50 (2013.01)

(58) Field of Classification Search
None
See application file for complete search history.

(56) References Cited

U.S. PATENT DOCUMENTS

| | | | | |
|---|---|---|---|---|
| 2002/0129274 A1* | 9/2002 | Baskey | ................... | G06F 9/544 726/1 |
| 2017/0353418 A1* | 12/2017 | Feng | ........................ | B25J 9/161 |
| 2017/0353554 A1* | 12/2017 | Feng | ................... | H04L 67/1097 |

* cited by examiner

*Primary Examiner* — Craig Dorais
(74) *Attorney, Agent, or Firm* — Seed IP Law Group LLP (57) ABSTRACT

This disclosure discloses a method and apparatus for transmitting data in a robot operating system. The robot operating system includes a transmitting node, a receiving node, and a shared memory as a transmission medium between the transmitting and receiving nodes. The method in a particular embodiment includes: traversing, by the transmitting node, a sequence of data templates stored in advance in the shared memory, and determining whether the respective data templates in the sequence of data templates are currently being written into or read from; identifying a data template in the sequence of data templates currently being neither written into nor read from as a target data template, and obtaining information of the target data template; and writing data into the target data template according to the information of the target data template. This embodiment can improve the performance of transmitting the data while occupying less memory resources.

16 Claims, 5 Drawing Sheets

METHOD AND APPARATUS FOR TRANSMITTING DATA IN A ROBOT OPERATING SYSTEM

CROSS-REFERENCE TO RELATED APPLICATION

This application is related to and claims priority from Chinese Application No. 201610805758.1, filed on Sep. 6, 2016, the entire disclosure of which is hereby incorporated by reference.

TECHNICAL FIELD

This disclosure generally relates to the field of computer technology, particularly to the field of operating system of computers, and more particularly to a method and apparatus for transmitting data in a robot operating system.

BACKGROUND

A Robot Operating System (ROS) may comprise a plurality of nodes and topics, where each node may be considered as an independent process. The nodes may be divided into two categories: transmitting nodes and receiving nodes, where a transmitting node may be configured to transmit acquired data, and a receiving node may be configured to receive the data transmitted by the transmitting node (occasionally a node can be both a transmitting node and a receiving node). A topic is a basis for establishing a connection between the nodes. After the nodes are connected with each other, the transmitting node and the receiving node can transmit data through a shared memory. Moreover, data of different topics may be transmitted using different shared memories.

At present, a common technology used to transmit data between the nodes is the streaming data transmission technology, which typically utilizes the following solution: the transmitting node first serializes the original data into streaming data according to certain encoding rules; then transmits the serialized streaming data through a socket or a shared memory; and finally the receiving node de-serializes the received streaming data into the original data according to the same encoding rule, in order to use the original data transmitted by the transmitting node.

Although the prior art is feasible, there are two apparent drawbacks: first, it is time consuming to serialize and de-serialize the data, thus degrading directly the data transmission performance; second, the data being transmitted has to be copied numerous times, thus occupying a considerable memory space.

SUMMARY

An object of this disclosure is to propose an improved method and apparatus for transmitting data in a robot operating system so as to address the technical problem as mentioned in the BACKGROUND.

In a first aspect, the disclosure provides a method for transmitting data in a robot operating system, the method including: traversing, by the transmitting node, a sequence of data templates stored in advance in the shared memory, and determining whether the respective data templates in the sequence of data templates are currently being written into or read from; identifying a data template in the sequence of data templates currently being neither written into nor read from as a target data template, and obtaining information of the target data template; and writing data into the target data template according to the information of the target data template.

In some embodiments, the traversing the sequence of data templates stored in advance in the shared memory, and determining whether the respective data templates in the sequence of data templates are currently being written into or read from comprises: obtaining sequence numbers of the data templates in the sequence of data templates currently being written into, wherein the respective sequence numbers of the data templates in the sequence of data templates are preset by the robot operating system; and monitoring sequentially, by starting from a sequence number greater than values of the obtained sequence numbers, and in an ascending order of the respective sequence numbers of the data templates in the sequence of data templates, whether the data templates currently not being written into in the sequence of data templates are currently being read from.

In some embodiments, the identifying a data template in the sequence of data templates currently being neither written into nor read from as a target data template, and obtaining information of the target data template comprises: in response to determining that a data template among the data templates currently not being written into in the sequence of data templates is not currently being read from, identifying the data template currently being neither written into nor read from as the target data template; in response to determining that each of the data templates currently not being written into in the sequence of data templates is currently being read from, monitoring in a cyclic order of the sequence numbers of the respective data templates in the sequence of data templates until a data template currently not being read is detected, and identifying the data template currently being neither written into nor read from as the target data template; and obtaining the information of the target data template.

In some embodiments, the data templates comprise data tables.

In some embodiments, the data comprise structured data and semi-structured data, the structured data and the semi-structured data are data logically represented in a two-dimensional table structure.

In a second aspect, the disclosure provides a method for transmitting data in a robot operating system, the method including: traversing, by the receiving node, a sequence of data templates stored in advance in the shared memory, and determining whether the respective data templates in the sequence of data templates are currently being written into; identifying a data template in the sequence of data templates currently not being written into as a target data template, and obtaining information of the target data template; and reading data in the target data template according to the information of the target data template.

In some embodiments, the traversing a sequence of data templates stored in advance in the shared memory, and determining whether the respective data templates in the sequence of data templates are currently being written into comprises: monitoring sequentially, in an ascending order of the respective sequence numbers of the data templates in the sequence of data templates, whether the respective data templates in the sequence of data templates are currently being written into, wherein the respective sequence numbers of the data templates in the sequence of data templates are preset by the robot operating system.

In some embodiments, the identifying a data template in the sequence of data templates currently not being written into as a target data template, and obtaining information of the target data template comprises: in response to determining that a data template in the sequence of data templates is not currently being written into, identifying the data template currently not being written into as the target data template; in response to determining that each of the data templates in the sequence of data templates is currently being written into, entering into a waiting status until completion of writing into a data template is detected, and identifying the data template which has been completed to be written into as the target data template; and obtaining the information of the target data template.

In some embodiments, the data templates comprise data tables.

In some embodiments, the data comprise structured data and semi-structured data, the structured data and the semi-structured data are data logically represented in a two-dimensional table structure.

In a third aspect, the disclosure provides an apparatus for transmitting data in a robot operating system, the apparatus including: a determining unit configured to traverse a sequence of data templates stored in advance in the shared memory, and determine whether the respective data templates in the sequence of data templates are currently being written into or read from; an obtaining unit configured to identify a data template in the sequence of data templates currently being neither written into nor read from as a target data template, and obtain information of the target data template; and a writing unit configured to write data into the target data template according to the information of the target data template.

In some embodiments, the determining unit includes: a sequence number obtaining module configured to obtain sequence numbers of the data templates in the sequence of data templates currently being written into, wherein the respective sequence numbers of the data templates in the sequence of data templates are preset by the robot operating system; and a monitoring module configured to monitor sequentially, by starting from a sequence number greater than values of the obtained sequence numbers, and in an ascending order of the respective sequence numbers of the data templates in the sequence of data templates, whether the data templates currently not being written into in the sequence of data templates are currently being read from.

In some embodiments, the obtaining unit includes: a first template determining module configured, in response to determining that a data template among the data templates currently not being written into in the sequence of data templates is not currently being read from, to identify the data template currently being neither written into nor read from as the target data template; a second template determining module configured, in response to determining that each of the data templates currently not being written into in the sequence of data templates is currently being read from, to monitor in a cyclic order of the sequence numbers of the respective data templates in the sequence of data templates until a data template currently not being read is detected, and to identify the data template currently being neither written into nor read from as the target data template; and an information obtaining module configured to obtain the information of the target data template.

In a fourth aspect, the disclosure provides an apparatus for transmitting data in a robot operating system, the apparatus including: a determining unit configured to traverse a sequence of data templates stored in advance in the shared memory, and to determine whether the respective data templates in the sequence of data templates are currently being written into; an obtaining unit configured to identify a data template in the sequence of data templates currently not being written into as a target data template, and to obtain information of the target data template; and a reading unit configured to read data in the target data template according to the information of the target data template.

In some embodiments, the determining unit is further configured to monitor sequentially, in an ascending order of the respective sequence numbers of the data templates in the sequence of data templates, whether the respective data templates in the sequence of data templates are currently being written into, wherein the respective sequence numbers of the data templates in the sequence of data templates are preset by the robot operating system.

In some embodiments, the obtaining unit includes: a first template determining module configured, in response to determining that a data template in the sequence of data templates is not currently being written into, to identify the data template currently not being written into as the target data template; a second template determining module configured, in response to determining that each of the data templates in the sequence of data templates is currently being written into, to enter into a waiting status until completion of writing into a data template is detected, and identify the data template which has been completed to be written into as the target data template; and an information obtaining module configured to obtain the information of the target data template.

With the method and apparatus for transmitting data in a robot operating system according to the embodiments of this disclosure, the data templates in the sequence of data templates stored in advance in the shared memory can be applied so as to avoid the data from being serialized and de-serialized, and avoid the data from being copied for a number of times to improve the performance of transmitting the data while occupying less memory resources.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF PREFERRED EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
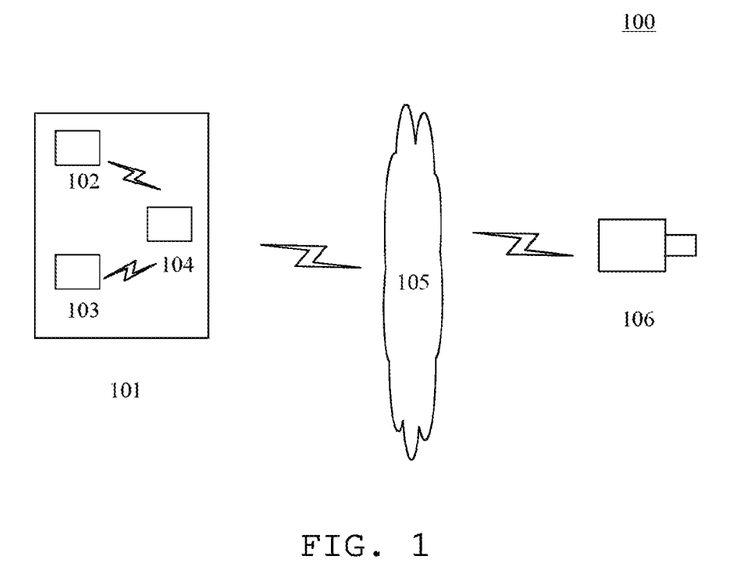
FIG. 1 is an architectural diagram of an exemplary system to which this disclosure can be applicable.

FIG. 1 illustrates an exemplary system architecture 100 to which a method for transmitting data in a robot operating system or an apparatus for transmitting data in a robot operating system according to an embodiment of this disclosure may be applicable.

As illustrated in FIG. 1, the system architecture 100 may include an on-vehicle terminal 101, an acquiring device 106, and a network 105 configured to provide a medium of a communication link between the on-vehicle terminal 101 and the acquiring device 106. The network 105 may include various types of connections, e.g., a wired or wireless communication link, an optic fiber cable, etc.

The acquiring device 106 may be any electronic device acquiring surrounding environmental information, including but not limited to a camera, a radar, a temperature sensor, an audio recording device, and the like.

There can be such an improved robot operating system installed on the on-vehicle terminal 101, which may include a transmitting node 102, a receiving node 103, and a shared memory 104. The robot operating system on the on-vehicle terminal 101 stores data acquired by the acquiring device 106 into the shared memory 104 to enable the data to be transmitted between the transmitting node 102 and the receiving node 103.

It shall be noted that the method for transmitting data in a robot operating system according to embodiments of this disclosure is generally performed by the on-vehicle terminal 101, and accordingly an apparatus for transmitting data in a robot operating system according to embodiments of this disclosure is generally arranged in the on-vehicle terminal 101.

It shall be appreciated that the numbers of on-vehicle terminals and acquiring devices in FIG. 1 are merely illustrative. There may be any numbers of on-vehicle terminals and acquiring devices as needed in practice.

Figure 2:
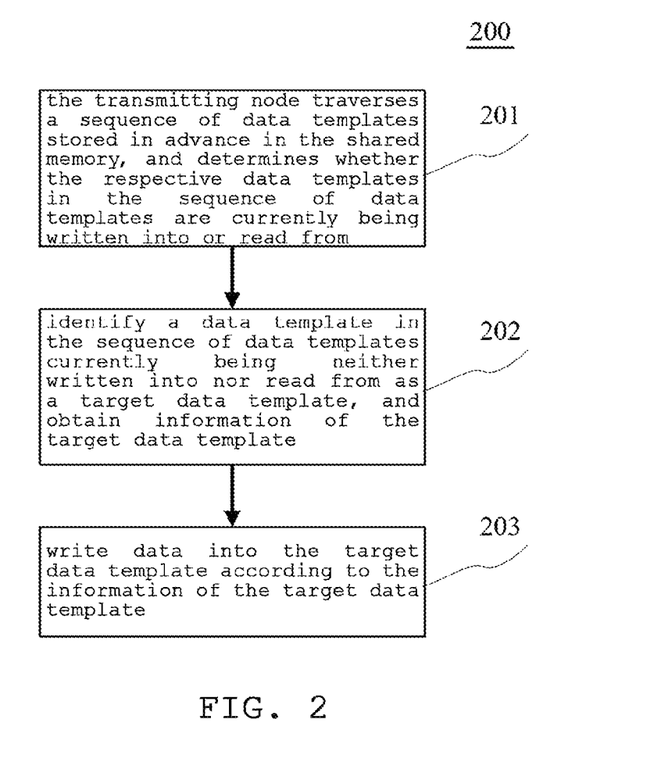
FIG. 2 is a flow chart of a method for transmitting data in a robot operating system according to an embodiment of this disclosure.

Further reference will be made to FIG. 2 illustrating a flowchart 200 of a method for transmitting data in a robot operating system according to an embodiment of this disclosure. The method for transmitting data in a robot operating system includes the following steps.

In step 201, a transmitting node traverses a sequence of data templates stored in advance in the shared memory, and determines whether the respective data templates in the sequence of data templates are currently being written into or read from.

In this embodiment, an electronic device (e.g., the on-vehicle terminal 101 illustrated in FIG. 1) on which the method for transmitting data in a robot operating system is performed transmits data by using a shared memory which is a transmission medium. The shared memory can be such a memory in a multi-node robot operating system, which is accessed by different nodes. A sequence of data templates can be stored in advance in the shared memory. The sequence of data templates can include one or more data templates, each of which can be provided with a sequence number. The data template may be a template in which data are stored in a certain structural form, e.g., an Extensible Markup Language (XML) file.

In this embodiment, the transmitting node can traverse the sequence of data templates in the shared memory in various orders, e.g., in an ascending or descending order of the sequence numbers of the data templates, before writing the data. The transmitting node can be a node transmitting the acquired data. In the meanwhile, the transmitting node can determine in various ways whether each data template in the sequence of data templates is currently being written into or read from. For example, it can be determined whether each data template is currently being written into or read from, according to a state identifier preset by the robot operating system for the data template. For example, if the state identifier of a data template is 10, it will be determined that the data template is currently being written into. If the state identifier of a data template is 01, it will be determined that the data template is currently being read from. If the state identifier of a data template is 00, it will be determined that the data template is currently being neither written into nor read from, that is, the transmitting node can write data into the data template. As an example, it can alternatively be determined whether each data template is currently being written into or read from, according to whether the data template is locked. If the data template is locked, it indicates that the data template is currently being written into or read from. If the data template is not locked, it indicates that data can be written into the template.

Alternatively, the shared memory can be allocated automatically by the robot operating system installed on the electronic device in advance for transmission of data between nodes; can be allocated collectively and manually in advance; or can be provided by requesting the robot operating system installed on the electronic device by the transmitting node to transmit data.

Alternatively, the data templates in the sequence of data templates can be created and stored in advance on the electronic device; or can be created by the transmitting node according to the existing data templates and the amount of data to be transmitted. For example, if the transmitting node has three pieces of data to be transmitted and discovers only one data template available as a result of traversing the sequence of data templates, the transmitting node may create two new data templates according to the existing data template. Moreover, the number of data templates in the sequence of data templates can be calculated automatically by the electronic device according to the size and use of the shared memory, or a threshold thereof (the maximum of the number of the data templates in a shared memory) can be set manually.

In some alternative implementations of this embodiment, the data templates can include data tables.

Step 202 is to identify a data template in the sequence of data templates currently being neither written into nor read from as a target data template, and obtain information of the target data template.

In this embodiment, the transmitting node can identify the data template in the sequence of data templates as the target data template, which is currently being neither written into nor read from as determined in step 201. For example, the transmitting node can mark the data template, or store the sequence number of the data template in a certain position to determine the target data template. And, the transmitting node can obtain the information of the target data template in a wired or wirelessly mode. As an example, the information of the data template can include but will not be limited to at least one of a field name, a field type, and a necessary condition. The field name can include various customized names and general names, the field type can include a length-fixed character type, a length-variable character type, a data character type, a date type, and the like, and the necessary condition can include a field which may or may not be Null, and can further include a field which may or may not be duplicated.

Alternatively, the transmitting node can further lock the target data template while identifying the data template currently being neither written into nor read from as the target data template, so that other transmitting nodes or receiving nodes can not access the target data template.

Step 203 is to write data into the target data template according to the information of the target data template.

In this embodiment, the transmitting node can write data into the target data template according to the structural form of the target data template and the information of the target data template obtained in step 202. For example, information about a product can include product name (coat), material (cotton), size (165/L), price/RMB (100), and other data. The product name, material, size, price/RMB can be written respectively into field names of the data template, and the field type of each of these field names can be a character type. Furthermore, the coat, cotton, 165/L, and 100 can be written respectively into fields corresponding to the respective field names, and the field types of these fields can be a character type, a character type, a numeral and character type, and a numeral type, respectively.

In some alternative implementations of this embodiment, the data may be structured data or semi-structured data which can be transmitted between nodes in the robot operating system, e.g., point cloud data acquired by a laser radar, including Height, Width, and other fields. The structured data is the data which can be logically represented in a two-dimension table construction, e.g., numerals, symbols, etc. The semi-structured data can be the data having a structural feature relative to a normal plaintext, e.g., data stored in an Object Exchange Model (OEM).

Alternatively, the transmitting node can notify in a wired or wireless mode the receiving node of an update to the data of a data template in the shared memory, after the data is written.

Figure 3:
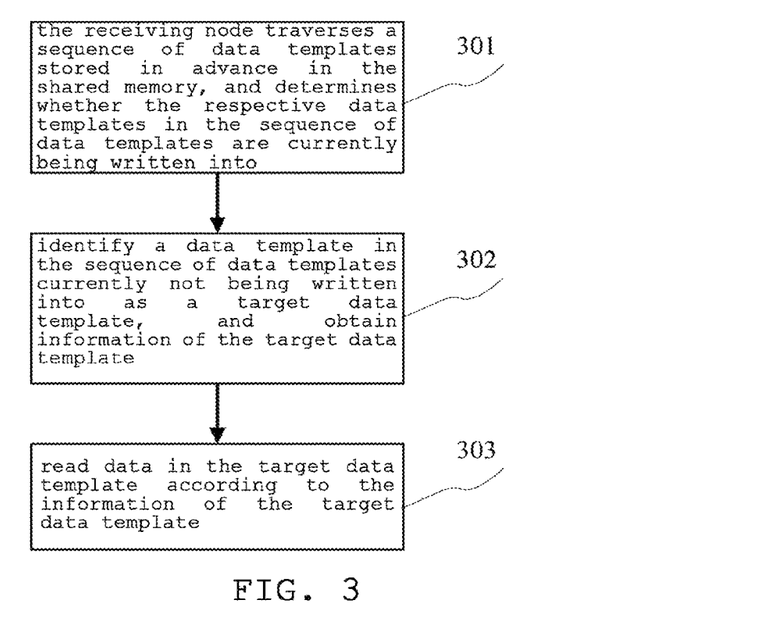
FIG. 3 is a flow chart of a method for transmitting data in a robot operating system according to another embodiment of this disclosure.

Further reference will be made to FIG. 3 illustrating a flowchart 300 of a method for transmitting data in a robot operating system according to an embodiment of this disclosure. The method for transmitting data in a robot operating system includes the following steps.

In step 301, the receiving node traverses a sequence of data templates stored in advance in the shared memory, and determines whether the respective data templates in the sequence of data templates are currently being written into.

In this embodiment, an electronic device (e.g., the on-vehicle terminal 101 illustrated in FIG. 1) on which the method for transmitting data in a robot operating system is performed transmits data by using a shared memory which is a transmission medium. The shared memory can be such a memory in a multi-node robot operating system, which is accessed by different nodes. A sequence of data templates can be stored in advance in the shared memory. Each data template in the sequence of data templates can be provided with a sequence number. The data template may be a template in which data are stored in a certain structural form, e.g., an XML file.

In this embodiment, the receiving node can traverse the sequence of data templates in the shared memory in various orders, e.g., in an ascending or descending order of the sequence numbers of the data templates, before reading the data. The receiving node can be a node receiving data transmitted from a transmitting node. In the meanwhile, the receiving node can determine in various ways whether each data template in the sequence of data templates is currently being written into. For example, it can be determined whether each data template is currently being written into, according to a write identifier preset by the robot operating system for the data template. For example, if the write identifier of a data template is 1, it will be determined that the data template is currently being written into. If the write identifier of a data template is 0, it will be determined that the data template is currently not being written into, that is, the receiving node can read data from the data template. As an example, it can alternatively be determined whether each data template is currently being written into, according to whether the data template is locked. If the data template is locked, it indicates that the data template is currently being written into. If the data template is not locked, it indicates that data can be read from the data template.

As an example, the receiving node can traverse the sequence of data templates stored in advance in the shared memory upon reception of a notification sent from the transmitting node that there is an update to data in a data template in the shared memory.

Alternatively, the shared memory can be allocated automatically by the robot operating system installed on the electronic device in advance for transmission of data between nodes; can be allocated collectively and manually in advance; or can be provided by requesting the robot operating system installed on the electronic device by the transmitting node to transmit data.

Alternatively, the data templates in the sequence of data templates can be created and stored in advance on the electronic device; or can be created by the transmitting node according to the existing data templates and the amount of data to be transmitted. Moreover, the number of data templates in the sequence of data templates can be calculated automatically by the electronic device according to the size and use of the shared memory, or a threshold thereof (the maximum of the number of the data templates in a shared memory) can be set manually.

In some alternative implementations of this embodiment, the data templates can further include data tables.

Step 302 is to identify a data template in the sequence of data templates currently not being written into as a target data template, and obtain information of the target data template.

In this embodiment, the receiving node can identify the data template in the sequence of data templates as the target data template, which is currently being not written into as determined in step 301. For example, the receiving node can mark the data template, or store the sequence number of the data template in a certain position to determine the target data template. And, the transmitting node can obtain the information of the target data template in a wired or wirelessly mode. As an example, the information of the data template can include but will not be limited to at least one of a field name, a field type, and a necessary condition. The field name can include various customized names and general names, the field type can include a length-fixed character type, a length-variable character type, a data character type, a date type, and the like, and the necessary condition can include a field which may or may not be Null, and can further include a field which may or may not be duplicated.

Alternatively, the receiving node can further lock the target data template while identifying the data template currently not being written into as the target data template, so that other transmitting nodes can not write data into the target data template.

Step 303 is to read data from the target data template according to the information of the target data template.

In this embodiment, the receiving node reads data from the target data template in the structural form of the target data template according to the information of the target data template obtained in step 302. For example, the data template may be an XML file in which the data of a product is stored as "<product name>coat</product name><material>cotton</material><price/RMB>100</price/RMB><size>165/L</size>." The receiving node can read the product name, the material, the price/RMB, and the size of the product from the data in "< >", and the corresponding detailed data coat, cotton, 100, and 165/L.

In some alternative implementations of this embodiment, the data may be structured data or semi-structured data which can be transmitted between nodes in the robot operating system, e.g., point cloud data acquired by a laser radar, including Height, Width, and other fields. The structured data is the data which can be logically represented in a two-dimension table construction, e.g., numerals, symbols, etc. The semi-structured data can be the data having a structural feature relative to a normal plaintext, e.g., data stored in an OEM.

Alternatively, the receiving node can notify the transmitting node in a wired or wireless mode after the data is read.

Figure 4:
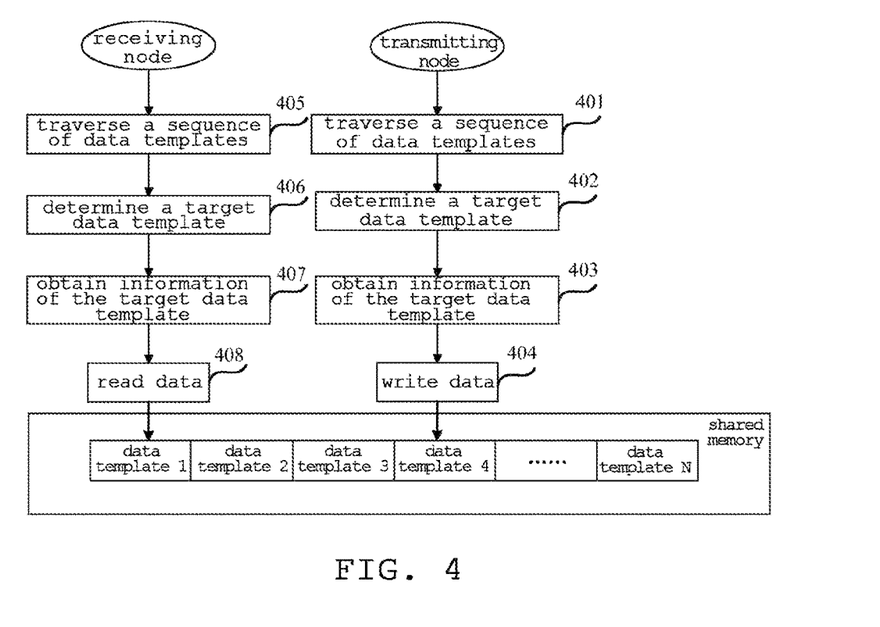
FIG. 4 is a schematic diagram of an application scenario of the methods for transmitting data in a robot operating system as illustrated in FIG. 2 and FIG. 3.

Further reference will be made to FIG. 4 which is a schematic diagram of an application scenario of the methods for transmitting data in a robot operating system according to the embodiments illustrated in FIG. 2 and FIG. 3. In the application scenario illustrated in FIG. 4, a driverless vehicle on which the electronic device (e.g., the on-vehicle terminal 101 illustrated in FIG. 1) is installed typically includes sensor nodes, perceiving nodes, positioning nodes, decision and control nodes, and the like, each of which can be a transmitting node or a receiving node. Data (typically structured data) can be transmitted between the respective nodes to achieve functions of the driverless vehicle. If there is data to be transmitted between the respective nodes in the driverless vehicle, a transmitting node among these nodes will traverse a sequence of data templates stored in advance in a shared memory (as denoted with the reference numeral 401). The sequence of data templates includes a data template 1, a data template 2, a data template 3, a data template 4, . . . , and a data template N, where N can represent the sequence number of a data template, and N is a positive integer. A data template which is currently being neither written into nor read from (e.g., the data template 4) is determined as a target data template (as denoted with the reference numeral 402). Information of the target data template (i.e., the data template 4) is obtained (as denoted with the reference numeral 403). Data to be transmitted is written into the data template 4 (as denoted with the data template 404). While the transmitting node accesses the data template in the shared memory, the receiving node can access other data templates in the shared memory. The receiving node among the nodes can traverse the sequence of data templates (as denoted with the reference numeral 405), and determine a data template which is currently not being written into (e.g., the data template 1) as a target data template (as denoted with the reference numeral 406). Moreover, the receiving node can obtain information of the target data template (the data template 1) (as denoted with the reference numeral 407), and read data written by the transmitting node in the data template 1 (as denoted with the reference numeral 408).

With the method according to the embodiment of this disclosure, the structured data or the semi-structured data can be written into or read from the data templates in the sequence of data templates in the shared memory to avoid the data from being serialized and de-serialized while being transmitted, so as to improve the performance of transmitting data between transmitting nodes and receiving nodes.

Figure 5:
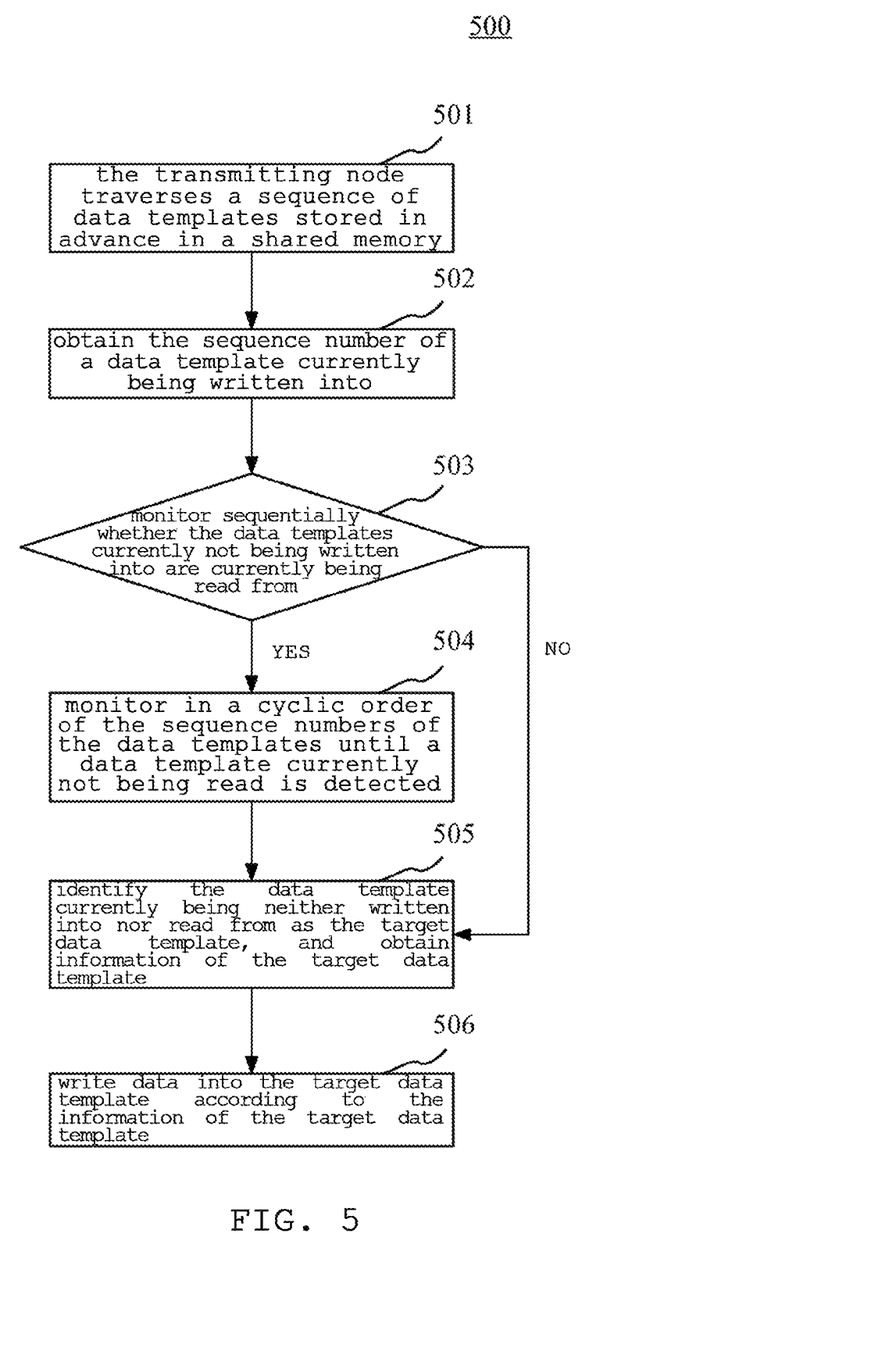
FIG. 5 is a flow chart of another embodiment of the method for transmitting data in a robot operating system as illustrated in FIG. 2.

Further reference will be made to FIG. 5 illustrating a flowchart 500 of another embodiment of the method for transmitting data as illustrated in FIG. 2. The flowchart 500 of this method includes the following steps.

In step 501, a transmitting node traverses a sequence of data templates stored in advance in a shared memory.

In this embodiment, this step is substantially the same as step 201, and thus will not be described in detail.

Step 502 is to obtain the sequence numbers of data templates currently being written into.

In this embodiment, the transmitting node can determine whether the respective data templates in the sequence of data templates are currently being written into, according to state identifiers preset by the robot operating system for the respective data templates, or according to whether the respective data templates are locked. After the data templates currently being written into are determined, the transmitting node can obtain the sequence numbers of the data templates currently being written into. The sequence numbers of the respective data templates in the sequence of data templates can be preset by the robot operating system.

Step 503 is to monitor sequentially whether the data templates currently not being written into are currently being read from.

In this embodiment, the transmitting node can traverse the sequence of data templates in an ascending order of the respective sequence numbers of the data templates starting from a sequence number larger than the value of the obtained sequence number of the data template currently being written into by M (M is a positive integer), and detect whether there is a data template currently not being read from, among the data templates currently not being written into. For example, if there is a data template currently being written into, the transmitting node will traverse starting from a sequence number larger than the value of the sequence number of the data template by 1. If there are a number of data templates currently being written into, the transmitting node will select the largest one of the sequence numbers of the data templates, and then traverse starting from the sequence number than the largest one by 1. For example, if the sequence numbers of the data templates currently being written into are 2 and 3, the larger one of the sequence numbers will be determined as 3, and the transmitting node can traverse starting from the data template 4 which is currently not being written into, and detect sequentially whether the data templates 4 to N currently not being written into are currently being read from.

In this embodiment, if there is no detected data template currently not being read from, among the data templates currently not being written into, the flow will proceed to step 504. If there is a detected data template currently not being read from, among the data templates currently not being written into, the flow will proceed to step 505.

Step 504 is to monitor cyclically in an order of the sequence numbers of the data templates until a data template currently not being read is detected.

In this embodiment, the transmitting node can monitor cyclically in an ascending order or a descending order of the sequence numbers of the respective data templates in the sequence of data templates until a data template currently not being read is detected. For example, if there are five data templates in total in the sequence of data templates and the sequence numbers of the data templates currently being written into are 2 and 3, the transmitting node will monitor sequentially the data templates 4, 5 and 1 currently not being written into, but find that the data templates 4, 5 and 1 are being read. Thus, the transmitting node can monitor cyclically the data templates 1, 4 and 5 starting from the data template 1 not being written into.

Step 505 is to determine the data template currently being neither written into nor read from as a target data template, and to obtain information of the target data template.

In this embodiment, this step 505 is substantially the same as step 202, and will not be described in detail.

Step 506 is to write data into the target data template according to the information of the target data template.

In this embodiment, this step 506 is substantially the same as step 203, and will not be described in detail.

As can be apparent from FIG. 5, as compared with the embodiment corresponding to FIG. 2, the flow 500 of the method for transmitting data in a robot operating system according to this embodiment highlights the step of determining the data template currently being neither written into nor read from. Accordingly, the solution according to this embodiment can prevent the simultaneous writing and reading by a plurality of nodes from being confused, so as to ensure the correctness throughout the method for transmitting data.

Figure 6:
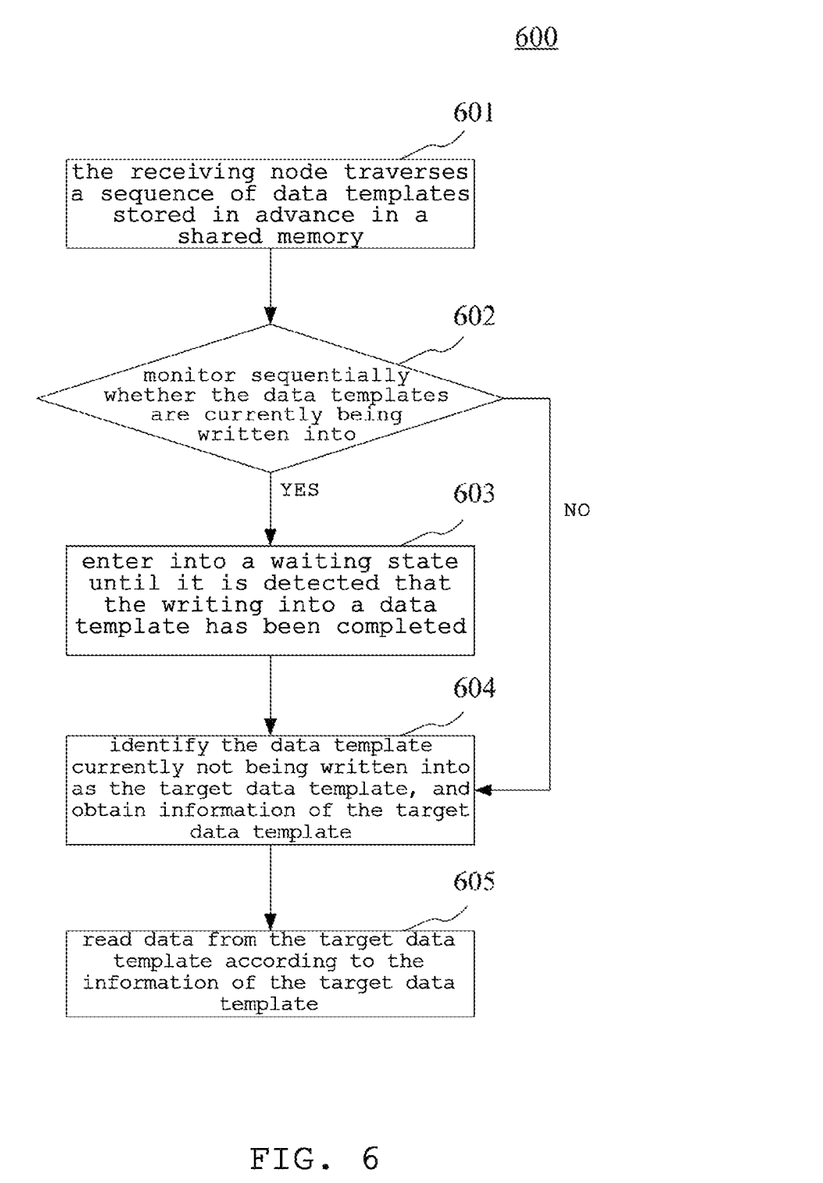
FIG. 6 is a flow chart of another embodiment of the method for transmitting data in a robot operating system as illustrated in FIG. 3.

Further reference will be made to FIG. 6 illustrating a flowchart 600 of another embodiment of the method for transmitting data as illustrated in FIG. 3. The flowchart 600 of this method includes the followings steps.

In step 601, a receiving node traverses a sequence of data templates stored in advance in a shared memory.

In this embodiment, this step 601 is substantially the same as step 301, and will not be described in detail.

Step 602 is to monitor sequentially whether the data templates are currently being written into.

In this embodiment, the receiving node monitors sequentially whether the respective data templates in the sequence of data templates are currently being written into, in an ascending order of the sequence numbers of the respective data templates in the sequence of data templates, as illustrated in step 301. The sequence numbers of the respective data templates can be preset by the robot operating system. If there is a data template currently being written into, the flow will proceed to step 603. If the data template is currently not being written into, the flow will proceed to step 604.

Step 603 is to enter into a wait state until it is detected that the written into the data template has been completed.

In this embodiment, if the receiving node detects a data template currently being written into, it will enter into the wait state until it is detected that the written into the data template has been completed, that is, the data template currently becomes a data template not being written into.

Step 604 is to determine the data template currently not being written into as a target data template, and to obtain information of the target data template.

In this embodiment, this step 604 is substantially the same as step 302, and will not be described in detail.

Step 605 is to read data from the target data template according to the information of the target data template.

In this embodiment, this step 605 is substantially the same as step 303, and will not be described in detail.

As can be apparent from FIG. 6, as compared with the embodiment corresponding to FIG. 3, the flow 600 of the method for transmitting data in a robot operating system according to this embodiment highlights the step of determining the data template currently being not written into. Accordingly, the solution according to this embodiment can prevent the simultaneous writing and reading by a plurality of nodes from being confused, so as to ensure the correctness throughout the method for transmitting data.

Further reference will be made to FIG. 7, and as an implementation of the method illustrated in the figures above, an embodiment of this disclosure provides an apparatus for transmitting data in a robot operating system. The embodiment of the apparatus corresponds to the embodiment of the method as illustrated in FIG. 2.

Figure 7:
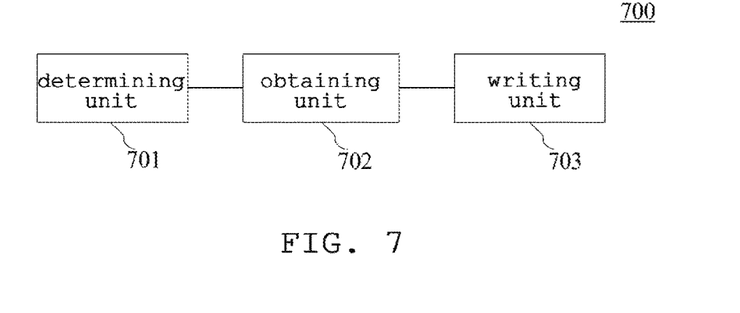
FIG. 7 is a schematic structural diagram of an apparatus for transmitting data in a robot operating system according to an embodiment of this disclosure.

As illustrated in FIG. 7, the apparatus 700 for transmitting data in a robot operating system according to this embodiment includes a determining unit 701, an obtaining unit 702, and a writing unit 703. The determining unit 701 is configured to traverse a sequence of data templates stored in advance in the shared memory, and determine whether the respective data templates in the sequence of data templates are currently being written into or read from. The obtaining unit 702 is configured to identify a data template in the sequence of data templates currently being neither written into nor read from as a target data template, and obtain information of the target data template. The writing unit 703 is configured to write data into the target data template according to the information of the target data template.

In some alternative implementations of this embodiment, the determining unit 701 includes: a sequence number obtaining module configured to obtain sequence numbers of the data templates in the sequence of data templates currently being written into, wherein the respective sequence numbers of the data templates in the sequence of data templates are preset by the robot operating system; and a monitoring module configured to monitor sequentially, by starting from a sequence number greater than values of the obtained sequence numbers, and in an ascending order of the respective sequence numbers of the data templates in the sequence of data templates, whether the data templates currently not being written into in the sequence of data templates are currently being read from.

In some alternative implementations of this embodiment, the obtaining unit 702 includes: a first template determining module configured, in response to determining that a data template among the data templates currently not being written into in the sequence of data templates is not currently being read from, to identify the data template currently being neither written into nor read from as the target data template; a second template determining module configured, in response to determining that each of the data templates currently not being written into in the sequence of data templates is currently being read from, to monitor in a cyclic order of the sequence numbers of the respective data templates in the sequence of data templates until a data template currently not being read is detected, and to identify the data template currently being neither written into nor read from as the target data template; and an information obtaining module configured to obtain the information of the target data template.

Alternatively, the data templates can include but will not be limited to data tables and XML files. The data can include structured data and semi-structured data.

Figure 8:
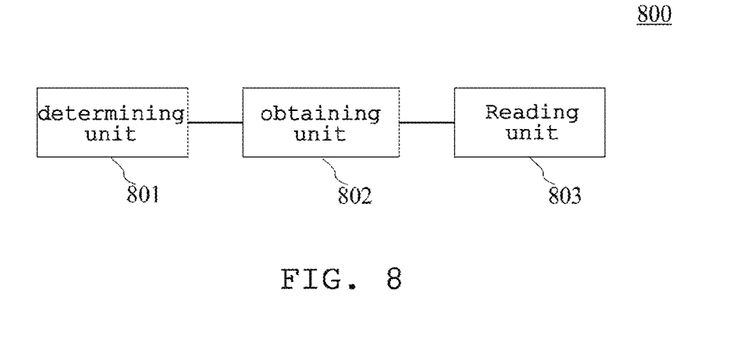
FIG. 8 is a schematic structural diagram of an apparatus for transmitting data in a robot operating system according to another embodiment of this disclosure.

Further reference can be made to FIG. 8, and as an implementation of the method illustrated in the figures above, an embodiment of this disclosure provides an apparatus for transmitting data in a robot operating system. The embodiment of the apparatus corresponds to the embodiment of the method as illustrated in FIG. 3.

As illustrated in FIG. 8, the apparatus 800 for transmitting data in a robot operating system according to this embodiment includes a determining unit 801, an obtaining unit 802, and a reading unit 803. The determining unit 801 is configured to traverse a sequence of data templates stored in advance in the shared memory, and to determine whether the respective data templates in the sequence of data templates are currently being written into. The obtaining unit 802 is configured to identify a data template in the sequence of data templates currently not being written into as a target data template, and to obtain information of the target data template. The reading unit 803 is configured to read data in the target data template according to the information of the target data template.

In some alternative implementations of this embodiment, the determining module 801 is further configured to monitor sequentially, in an ascending order of the respective sequence numbers of the data templates in the sequence of data templates, whether the respective data templates in the sequence of data templates are currently being written into, wherein the respective sequence numbers of the data templates in the sequence of data templates are preset by the robot operating system.

In some alternative implementations of this embodiment, the obtaining unit 802 includes: a first template determining module configured, in response to determining that a data template in the sequence of data templates is not currently being written into, to identify the data template currently not being written into as the target data template; a second template determining module configured, in response to determining that each of the data templates in the sequence of data templates is currently being written into, to enter into a waiting status until completion of writing into a data template is detected, and identify the data template which has been completed to be written into as the target data template; and an information obtaining module configured to obtain the information of the target data template.

Alternatively, the data templates can include but will not be limited to data tables and XML files. The data can include structured data and semi-structured data.

Figure 9:
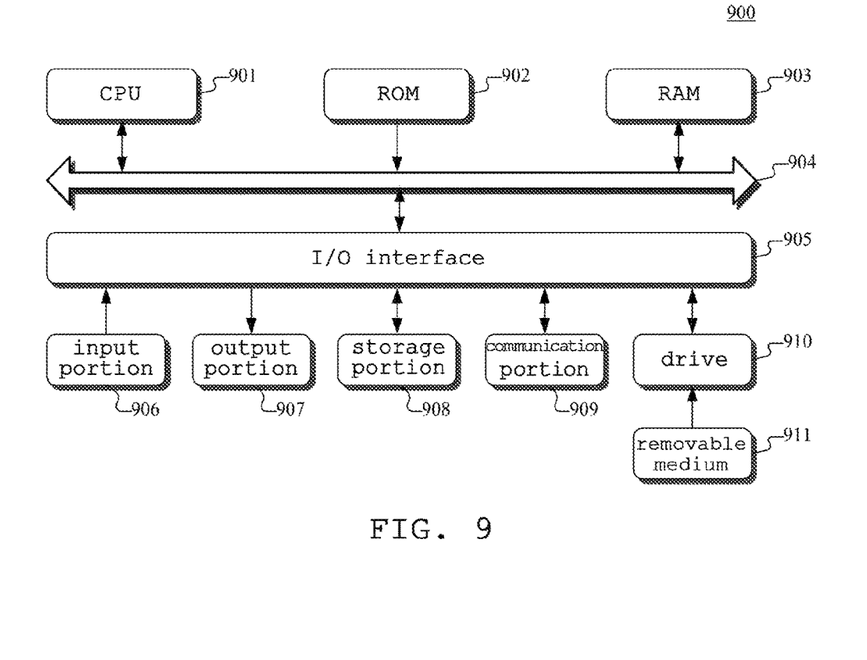
FIG. 9 is a schematic structural diagram of a computer system in which a terminal device according to an embodiment of this disclosure may be embodied.

Referring to FIG. 9, a schematic structural diagram of a computer system 900 adapted to implement a terminal apparatus of the embodiments of the present application is shown.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse etc.; an output portion 907 comprising a cathode ray tube (CRT), a liquid crystal display device (LCD), a speaker etc.; a storage portion 908 including a hard disk and the like; and a communication portion 909 comprising a network interface card, such as a LAN card and a modem. The communication portion 909 performs communication processes via a network, such as the Internet. A driver 910 is also connected to the I/O interface 905 as required. A removable medium 911, such as a magnetic disk, an optical disk, a magneto-optical disk, and a semiconductor memory, may be installed on the driver 910, to facilitate the retrieval of a computer program from the removable medium 911, and the installation thereof on the storage portion 908 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 909, and/or may be installed from the removable media 911.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a determining unit, an obtaining unit and a writing unit, where the names of these units or modules are not considered as a limitation to the units or modules. For example, the writing unit may also be described as "a unit for writing data into the target data template".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to: traverse a sequence of data templates stored in advance in the shared memory, and determine whether the respective data templates in the sequence of data templates are currently being written into or read from; identify a data template in the sequence of data templates currently being neither written into nor read from as a target data template, and obtain information of the target data template; and write data into the target data template according to the information of the target data template.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for transmitting data in a robot operating system to improve data transmission performance or reduce required memory resources, the robot operating system comprising a transmitting node, a receiving node, and a shared memory as a transmission medium between the transmitting node and the receiving node, the method comprising:
    traversing, by the transmitting node, a sequence of data templates stored in advance in the shared memory, and determining whether respective data templates in the sequence of data templates are currently being written into or read from;
    identifying one of the data templates in the sequence of data templates currently being neither written into nor read from as a target data template, and obtaining information of the target data template; and
    writing data into the target data template according to the information of the target data template.

2. The method according to claim 1, wherein the traversing the sequence of data templates stored in advance in the shared memory, and determining whether the respective data templates in the sequence of data templates are currently being written into or read from comprises:
    obtaining sequence numbers of the data templates in the sequence of data templates currently being written into, wherein the respective sequence numbers of the data templates in the sequence of data templates are preset by the robot operating system; and
    monitoring sequentially, by starting from a sequence number greater than values of the obtained sequence numbers, and in an ascending order of the respective sequence numbers of the data templates in the sequence of data templates, whether the data templates currently not being written into in the sequence of data templates are currently being read from.

3. The method according to claim 2, wherein the identifying one of the data templates in the sequence of data templates currently being neither written into nor read from as a target data template, and obtaining information of the target data template comprises:
    in response to determining that one of the data templates among the data templates currently not being written into in the sequence of data templates is not currently being read from, identifying the data template currently being neither written into nor read from as the target data template;
    in response to determining that each of the data templates currently not being written into in the sequence of data templates is currently being read from, monitoring in a cyclic order of the sequence numbers of the respective data templates in the sequence of data templates until one of the data templates currently not being read is detected, and identifying the data template currently being neither written into nor read from as the target data template; and
    obtaining the information of the target data template.

4. The method according to claim 1, wherein the data templates comprise data tables.

5. The method according to claim 1, wherein the data comprise structured data and semi-structured data, the structured data and the semi-structured data are data logically represented in a two-dimensional table structure.

6. A method for transmitting data in a robot operating system to improve data transmission performance or reduce required memory resources, the robot operating system comprising a transmitting node, a receiving node, and a shared memory as a transmission medium between the transmitting node and the receiving node, the method comprising:
    traversing, by the receiving node, a sequence of data templates stored in advance in the shared memory, and determining whether respective data templates in the sequence of data templates are currently being written into;
    identifying one of the data templates in the sequence of data templates currently not being written into as a target data template, and obtaining information of the target data template; and
    reading data in the target data template according to the information of the target data template.

7. The method according to claim 6, wherein the traversing a sequence of data templates stored in advance in the shared memory, and determining whether the respective data templates in the sequence of data templates are currently being written into comprises:
    monitoring sequentially, in an ascending order of the respective sequence numbers of the data templates in the sequence of data templates, whether the respective data templates in the sequence of data templates are currently being written into, wherein the respective sequence numbers of the data templates in the sequence of data templates are preset by the robot operating system.

8. The method according to claim 7, wherein the identifying one of the data templates in the sequence of data templates currently not being written into as a target data template, and obtaining information of the target data template comprises:
    in response to determining that a data template one of the data templates in the sequence of data templates is not currently being written into, identifying the data template currently not being written into as the target data template;
    in response to determining that each of the data templates in the sequence of data templates is currently being written into, entering into a waiting status until completion of writing into one of the data templates is detected, and identifying the data template which has been completed to be written into as the target data template; and
    obtaining the information of the target data template.

9. The method according to claim 6, wherein the data templates comprise data tables.

10. The method according to claim 6, wherein the data comprise structured data and semi-structured data, the structured data and the semi-structured data are data logically represented in a two-dimensional table structure.

11. An apparatus for transmitting data in a robot operating system to improve data transmission performance or reduce required memory resources, the robot operating system comprising a transmitting node, a receiving node, and a shared memory as a transmission medium between the transmitting node and the receiving node, the apparatus comprising:

a determining unit configured to traverse a sequence of data templates stored in advance in the shared memory, and determine whether respective data templates in the sequence of data templates are currently being written into or read from;

an obtaining unit configured to identify one of the data templates in the sequence of data templates currently being neither written into nor read from as a target data template, and obtain information of the target data template; and a writing unit configured to write data into the target data template according to the information of the target data template.

12. The apparatus according to claim 11, wherein the determining unit comprises:

a sequence number obtaining module configured to obtain sequence numbers of the data templates in the sequence of data templates currently being written into, wherein the respective sequence numbers of the data templates in the sequence of data templates are preset by the robot operating system; and a monitoring module configured to monitor sequentially, by starting from a sequence number greater than values of the obtained sequence numbers, and in an ascending order of the respective sequence numbers of the data templates in the sequence of data templates, whether the data templates currently not being written into in the sequence of data templates are currently being read from.

13. The apparatus according to claim 12, wherein the obtaining unit comprises:

a first template determining module configured, in response to determining that one of the data templates among the data templates currently not being written into in the sequence of data templates is not currently being read from, to identify the data template currently being neither written into nor read from as the target data template;

a second template determining module configured, in response to determining that each of the data templates currently not being written into in the sequence of data templates is currently being read from, to monitor in a cyclic order of the sequence numbers of the respective data templates in the sequence of data templates until one of the data templates currently not being read is detected, and to identify the data template currently being neither written into nor read from as the target data template; and an information obtaining module configured to obtain the information of the target data template.

14. An apparatus for transmitting data in a robot operating system to improve data transmission performance or reduce required memory resources, the robot operating system comprising a transmitting node, a receiving node, and a shared memory as a transmission medium between the transmitting node and the receiving node, the apparatus comprising:

a determining unit configured to traverse a sequence of data templates stored in advance in the shared memory, and to determine whether respective data templates in the sequence of data templates are currently being written into;

an obtaining unit configured to identify one of the data templates in the sequence of data templates currently not being written into as a target data template, and to obtain information of the target data template; and a reading unit configured to read data in the target data template according to the information of the target data template.

15. The apparatus according to claim 14, wherein the determining unit is further configured to:

monitor sequentially, in an ascending order of the respective sequence numbers of the data templates in the sequence of data templates, whether the respective data templates in the sequence of data templates are currently being written into, wherein the respective sequence numbers of the data templates in the sequence of data templates are preset by the robot operating system.

16. The apparatus according to claim 15, wherein the obtaining unit comprises:

a first template determining module configured, in response to determining that one of the data templates in the sequence of data templates is not currently being written into, to identify the data template currently not being written into as the target data template;

a second template determining module configured, in response to determining that each of the data templates in the sequence of data templates is currently being written into, to enter into a waiting status until completion of writing into one of the data templates is detected, and identify the data template which has been completed to be written into as the target data template; and an information obtaining module configured to obtain the information of the target data template.

* * * * *

UNITED STATES PATENT AND TRADEMARK OFFICE
CERTIFICATE OF CORRECTION

Page 1 of 1

PATENT NO.         : 9,965,344 B2
APPLICATION NO.    : 15/409946
DATED              : May 8, 2018
INVENTOR(S)        : Liming Xia et al.

It is certified that error appears in the above-identified patent and that said Letters Patent is hereby corrected as shown below:

Column 16, Lines 53-54:
"in response to determining that a data template one of the data templates in the sequence" should read, --in response to determining that one of the data templates in the sequence--.

Signed and Sealed this
Eighteenth Day of September, 2018

Andrei Iancu
*Director of the United States Patent and Trademark Office*